United States Patent
Kawai

(10) Patent No.: US 10,511,781 B2
(45) Date of Patent: Dec. 17, 2019

(54) IMAGE PICKUP APPARATUS, CONTROL METHOD FOR IMAGE PICKUP APPARATUS

(71) Applicant: CANON KABUSHIKI KAISHA, Tokyo (JP)

(72) Inventor: Yusuke Kawai, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 28 days.

(21) Appl. No.: 15/897,683

(22) Filed: Feb. 15, 2018

(65) Prior Publication Data

US 2018/0241949 A1    Aug. 23, 2018

(30) Foreign Application Priority Data

Feb. 22, 2017    (JP) .................................. 2017-031502

(51) Int. Cl.
*H04N 5/232* (2006.01)
*G06T 7/571* (2017.01)

(52) U.S. Cl.
CPC ......... *H04N 5/23296* (2013.01); *G06T 7/571* (2017.01); *H04N 5/2328* (2013.01)

(58) Field of Classification Search
None
See application file for complete search history.

(56) References Cited

U.S. PATENT DOCUMENTS

| | | | | |
|---|---|---|---|---|
| 2009/0167923 | A1* | 7/2009 | Safaee-Rad | H04N 5/23212 348/345 |
| 2009/0225199 | A1* | 9/2009 | Ferren | H04N 5/23212 348/240.99 |
| 2013/0141630 | A1* | 6/2013 | Li | H04N 5/23212 348/348 |
| 2015/0358542 | A1* | 12/2015 | Sato | H04N 5/265 348/239 |
| 2017/0070720 | A1* | 3/2017 | Bishop | H04N 5/23229 |
| 2018/0063409 | A1* | 3/2018 | Rivard | H04N 5/2258 |
| 2018/0359412 | A1* | 12/2018 | Oliver | H04N 5/23229 |

FOREIGN PATENT DOCUMENTS

JP    2015-216532 A    12/2015

\* cited by examiner

*Primary Examiner* — James M Hannett
(74) *Attorney, Agent, or Firm* — Canon U.S.A., Inc. IP Division

(57) ABSTRACT

An image pickup apparatus includes an image pickup unit configured to capture a plurality of images having different focus positions, and a depth of field control unit configured to control a depth of field when the image pickup unit captures an image, wherein, if it is determined that a plurality of subject areas satisfies a predetermined condition based on a distance for each subject area, a depth of field when the image pickup unit captures one of the plurality of images is increased, in comparison with a case where the predetermined condition is not satisfied. The predetermined condition includes a difference of any two in the plurality of subject areas being at a distance greater than a predetermine distance.

16 Claims, 10 Drawing Sheets

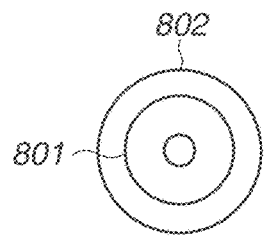
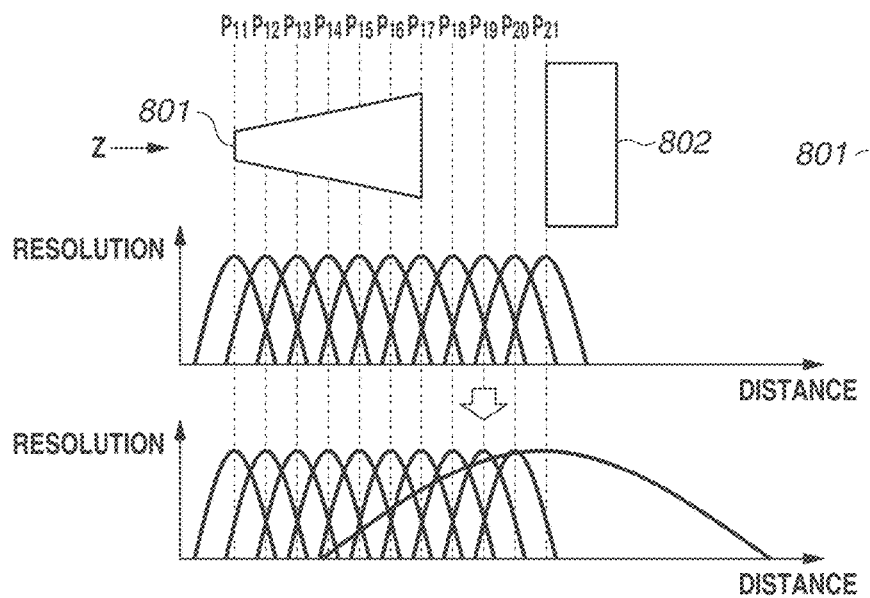
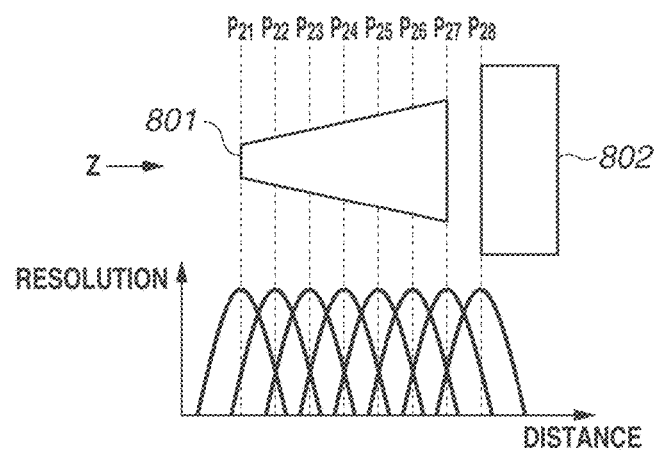

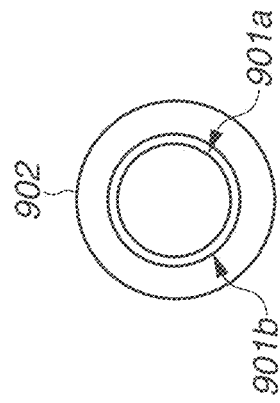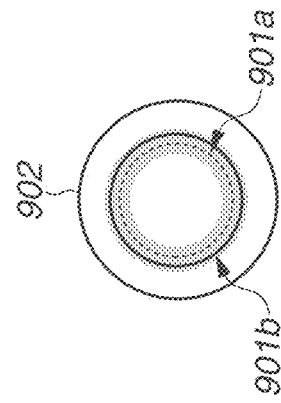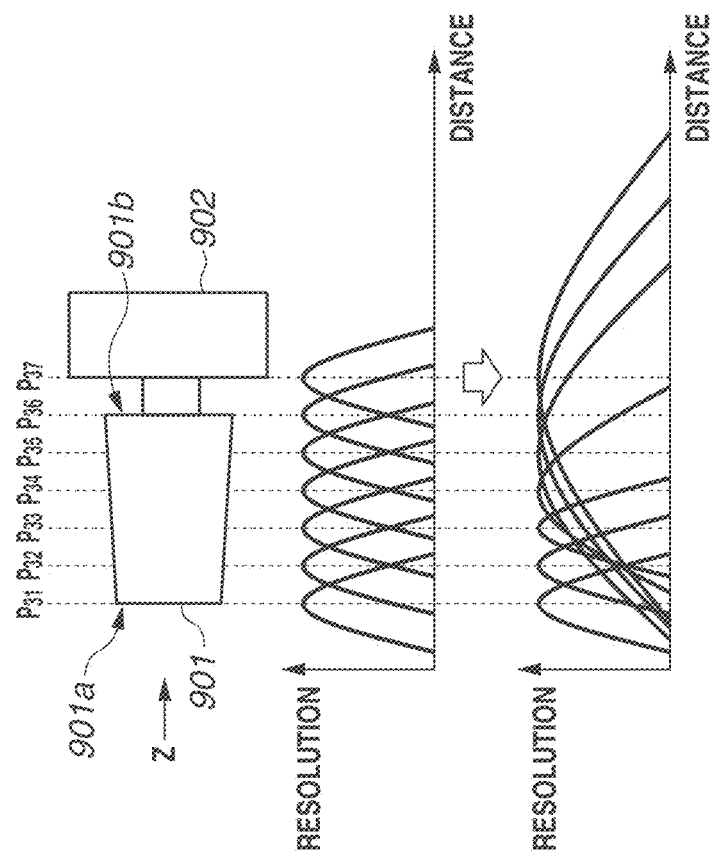

IMAGE PICKUP APPARATUS, CONTROL METHOD FOR IMAGE PICKUP APPARATUS

BACKGROUND OF THE INVENTION

Field of the Invention

The present invention relates to an image pickup apparatus, and more particularly to an image pickup apparatus for capturing images having different focus positions.

Description of Related Art

In a case where an image pickup apparatus such as a digital camera captures an image including a plurality of subjects having different distances from the image pickup apparatus, or the camera captures an image of a subject that is long in a depth direction, only one portion of the subject can be in focus due to insufficient depth of field of an optical system of the image pickup apparatus. Japanese Patent Application Laid-Open No. 2015-216532 discusses a focus stacking technique, in which, a plurality of images having different focus positions is captured, and only an in-focus area is extracted from each of the images to combine the extracted in-focus areas into one image. The focus stacking technique thereby generates a combined image in which the entire imaging area is in focus. The focus stacking technique is also known as focal plane merging, all-in-focus, or z-stacking. The fusion of images from different focal planes is performed by an image processor through image analysis, for example, using edge detection of various in-focus areas captured at different focal planes.

When such image capturing and focusing technique is performed, a user first designates a focus position, or an autofocus (AF) mechanism included in a digital camera detects a focus position to serve as a main focus position. The digital camera then sets a plurality of focus positions near the main focus position, and captures an image at each of the focus positions. Then, the digital camera extracts areas having high in-focus level from the plurality of captured images, and combines the extracted areas.

However, the inventor has found that variations in positional relationship between a digital camera and a subject tends to cause blurring of the subject and degradation in image quality even in a combined image generated by such an image capturing method.

SUMMARY OF THE INVENTION

The present invention relates to an image pickup apparatus capable of capturing a plurality of images having different focus positions for generating a combined image in which blurring of a subject is efficiently prevented, reduced, and/or corrected.

According to an aspect of the present invention, an image pickup apparatus includes an image sensor configured to capture a plurality of images at different focus positions of an optical system, and a control circuit configured to control a depth of field of the optical system when the image sensor captures an image, wherein, if the control circuit determines that a plurality of subject areas satisfies a predetermined condition based on a distance for each subject area, the control circuit increases a depth of field of the optical system in a case where the image sensor captures one of the plurality of images, in comparison with a case where the plurality of subject areas does not satisfy the predetermined condition, and wherein the predetermined condition includes a difference in distance of any two of the plurality of subject areas in optical axis direction being greater than the predetermined distance.

According to another aspect of the present invention, an image pickup apparatus includes an image sensor configured to capture a plurality of images at different focus positions of an optical system, and a control circuit configured to control a depth of field of the optical system when the image sensor captures an image, wherein, if a subject area is positioned on a close distance side relative to a predetermined distance, the control circuit causes the image sensor to capture a plurality of images by using a plurality of depths of field at a focus position on the close distance side, and wherein the control circuit causes any of the depths of field in when the images are captured by the image sensor at the focus position on the close distance side to be larger than a depth of field when another image is captured.

Further features of the present invention will become apparent from the following description of exemplary embodiments with reference to the attached drawings.

BRIEF DESCRIPTION OF THE DRAWINGS

FIG. 8A is a diagram illustrating a setting value of an aperture in a case where subjects 801 and 802 are close to each other according to the present exemplary embodiment, FIG. 8B is a diagram illustrating an image with the subjects 801 and 802 as seen from an image capturing direction, and FIG. 8C is a diagram illustrating a setting value of the aperture in a case where the subjects 801 and 802 are far from each other.

FIG. 9A is another diagram illustrating a setting value of the aperture according to a position of a subject in the present exemplary embodiment, and FIGS. 9B and 9C are diagrams each illustrating an image with subjects 901 and 902 as seen from an image capturing direction.

DESCRIPTION OF THE EMBODIMENTS

Hereinafter, exemplary embodiments are described in detail with reference to the drawings.

Figure 1:
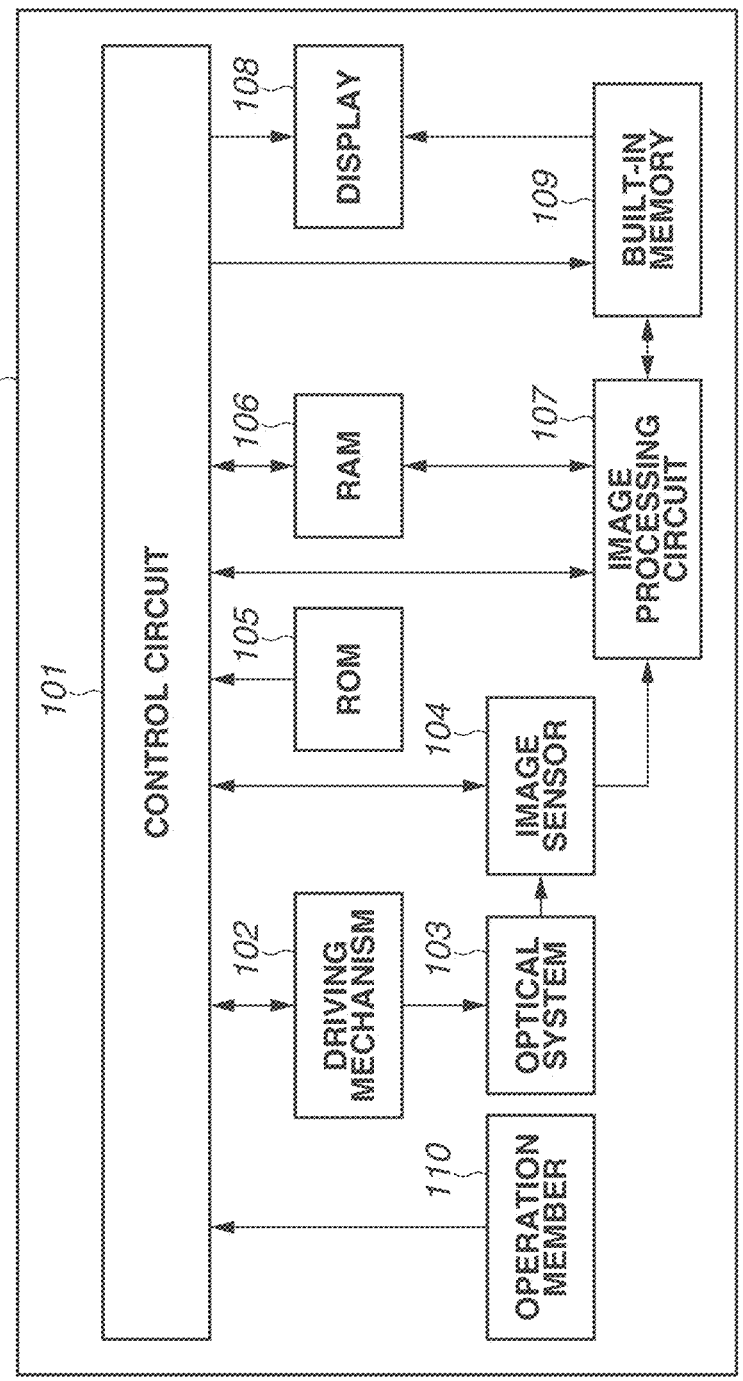
FIG. 1 is a block diagram illustrating a configuration of a digital camera according to an exemplary embodiment.

FIG. 1 is a block diagram illustrating a configuration of a digital camera 100 according to an exemplary embodiment.

A control circuit 101 is, for example, a signal processor such as a central processing unit (CPU) and a micro processing unit (MPU). The control circuit 101 reads a program stored in a read only memory (ROM) 105 to control each unit of the digital camera 100. For example, the control circuit 101 issues a command to an image sensor 104 (described below) to begin image capturing, and a command to the image sensor 104 to end the image capturing. In addition, the control circuit 101 issues an image processing command to an image processing circuit 107 (described below) based on a program stored in the ROM 105. A command from a user of the digital camera 100 is input to the digital camera 100 by an operation member 110 (described below), and then reaches each unit of the digital camera 100 via the control circuit 101.

A driving mechanism 102 includes a motor. The driving mechanism 102 mechanically operates an optical system 103 (described below) according to the command from the control circuit 101. For example, the driving mechanism 102 moves a position of a focus lens included in the optical system 103 based on a command from the control circuit 101 to adjust a focal length of the optical system 103.

The optical system 103 includes a zoom lens, the focus lens, and a diaphragm. The diaphragm is a mechanism for adjusting an amount of light transmitting therethrough. A change in a position of the focus lens can change a focus position.

The image sensor 104 is a photoelectric conversion unit for photoelectrically converting an optical signal that has entered the image sensor 104 into an electric signal. For example, a sensor such as a charge-coupled device (CCD) sensor or a complementary metal-oxide-semiconductor (CMOS) sensor can be used as the image sensor 104.

Figure 2:
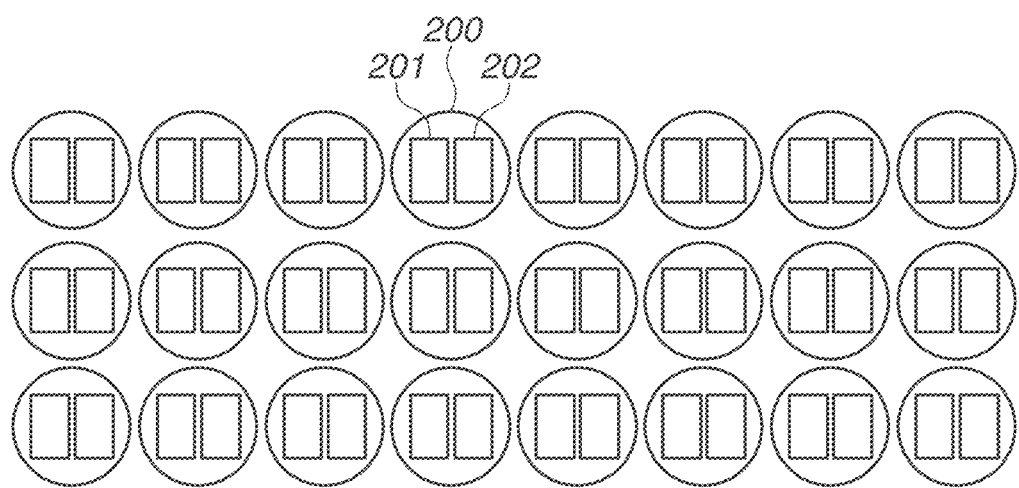
FIG. 2 is a diagram illustrating an example of a sensor array of an image sensor capable of acquiring distance information of a subject according to the present exemplary embodiment.

FIG. 2 is a diagram illustrating an example of a sensor array included in the image sensor 104 capable of acquiring distance information of a subject according to the present exemplary embodiment. FIG. 2 illustrates a structure in a case where a pixel 200 includes two photoelectric conversion units 201 and 202 that can independently read optical signals. In FIG. 2, each pixel includes two photoelectric conversion units. However, the number of photoelectric conversion units is not limited to two. Each pixel may include three or more photoelectric conversion units. For example, a technique for arranging four photoelectric conversion units in two separate directions of horizontal and vertical directions has been known. Hereinafter, a description is given based on a structure in which one pixel includes two photoelectric conversion units.

Figure 3:
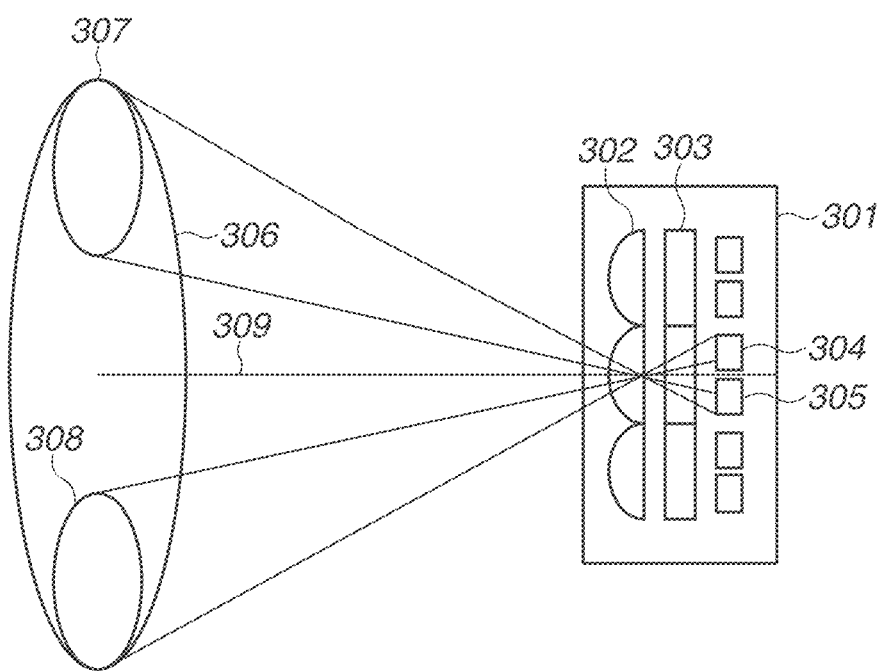
FIG. 3 is a diagram illustrating a state in which an optical signal enters a pixel including a plurality of photoelectric conversion units according to the present exemplary embodiment.

FIG. 3 is a diagram illustrating a state in which an optical signal enters a pixel including a plurality of photoelectric conversion units according to the present exemplary embodiment.

In FIG. 3, a pixel array 301 includes micro lenses 302, color filters 303, and photoelectric conversion units 304 and photoelectric conversion units 305. A photoelectric conversion unit 304 and a photoelectric conversion unit 305 belong to a same pixel, and correspond to one common micro lens 302 and one common color filter 303. FIG. 3 is a diagram illustrating the digital camera 100 as seen from the top, and indicates that the two photoelectric conversion units 304 and 305 corresponding to one pixel are arranged side by side. A light flux (corresponding to a light flux from an area 307) passing through an upper side of the exit pupil 306 relative to an optical axis 309 as a border out of light fluxes enters the photoelectric conversion unit 305. On the other hand, light flux (corresponding to light flux from an area 308) on a lower side of exit pupil 306 relative to the optical axis 309 out of light fluxes enters the photoelectric conversion unit 304. In other words, the photoelectric conversion units 304 and 305 receive light of different areas of the exit pupil 306 of an imaging lens. Here, a signal received by the photoelectric conversion units 304 is referred as an A-image signal, and a signal received by the photoelectric conversion unit 305 is referred as a B-image signal. In such a case, a defocus amount can be calculated based on a phase difference of a pair of pupil-divided images as the A-image and the-B image. Hence, distance information can be acquired. Particularly, in a case where pixels each including two photoelectric conversion units are arranged on the entire image sensor 104, the image sensor 104 can acquire distance information of a subject in any position on a screen.

However, the distance information can be acquired using the image sensor 104 including normal pixels, instead of pixels each including two photoelectric conversion units. For example, the control circuit 101 causes the image sensor 104 to perform an image capturing operation while changing relative positions of a plurality of lenses arranged in the optical system 103, so that a plurality of images having different focus positions is generated. The image processing circuit 107 divides each image into blocks, and calculates contrast of the divided block. The image processing circuit 107 compares contrasts of the blocks in the same positions in a plurality of captured images, and determines that the block having the largest contrast is in focus. Lastly, the image processing circuit 107 can determine distance information of each of the blocks based on a focus position of the captured image including the block in focus.

The ROM 105 is a read only nonvolatile memory serving as a recording medium. The ROM 105 stores an operation program for each block of the digital camera 100, and a parameter that is necessary for operation of each block. A random access memory (RAM) 106 is a rewritable volatile memory, and is used as a temporary storage area for data output in the operation of each block of the digital camera 100.

The image processing circuit 107 performs various image processing such as white balance adjustment, color interpolation, and filtering with respect to an image output from the image sensor 104 or image signal data recorded in a built-in memory 109 (described below). Moreover, the image processing circuit 107 performs compression processing on image signal data of an image captured by the image sensor 104 according to a standard such as Joint Photographic Experts Group (JPEG).

The image processing circuit 10 includes an application specific integrated circuit (ASIC) in which circuits for specific processing are collected. Alternatively, the control circuit 101 may perform processing according to a program read from the ROM 105, so that the control circuit 101 can partially or entirely perform functions of the image processing circuit 107. In a case where the control circuit 101 performs the entire functions of the image processing circuit 107, the image processing circuit 107 is no longer needed as hardware.

A display 108, such as a liquid crystal display (LCD) and an organic electro-luminescence (EL) display, displays an image temporarily stored in the RAM 106, an image stored in the built-in memory 109 (described below), or a setting screen of the digital camera 100. The display 108 enables an image acquired by the image sensor 104 to be reflected as a display image in real time, and thus, the display 108 can display a live view image.

In the built-in memory 109, an image captured by the image sensor 104, an image processed by the image processing circuit 107, and information of a focus position at the time of image capturing are recorded. A memory such as a memory card may be used instead of the built-in memory 109.

An operation member 110 is, for example, a button, a switch, a key, and a mode dial of the digital camera 100, or a touch panel that can be provided on the display 108. A command input by a user using the operation member 110 reaches the control circuit 101, and the control circuit 101 controls an operation of each block according to the command.

FIGS. 4A through 4D are diagrams illustrating a state in which a subject image is formed on an imaging plane according to the present exemplary embodiment.

Figure 4A:
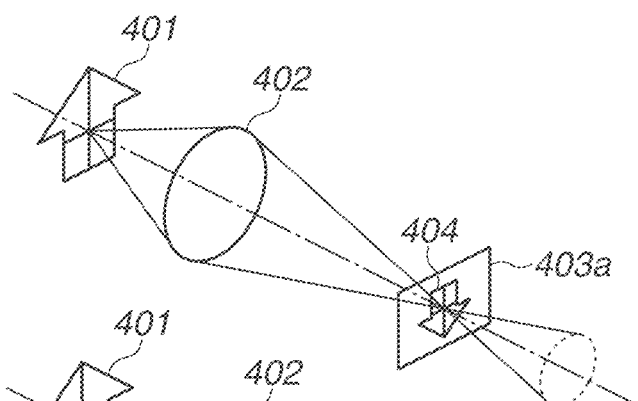
FIGS. 4A and 4C are diagrams illustrating a state in which a subject image is formed on an imaging plane if a subject is in focus according to the present exemplary embodiment.

FIG. 4A illustrates a state in which an image of a subject 401 is formed as an image 404 on a plane 403a by an optical system (optical lens 402). Thus, in a case where the plane 403a and an imaging sensor plane of the image sensor 104 match each other, the subject 401 is formed as a "point" on the plane 403a and recorded as an in-focus image.

Figure 4B:
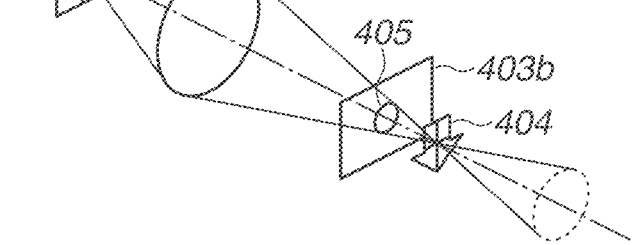
FIGS. 4B and 4D are diagrams illustrating a state in which a subject image is formed on an imaging plane if a subject is out of focus.

FIG. 4B illustrates a case where an image forming plane and the imaging sensor plane do not match each other. If an imaging sensor plane 403b is at a position different from the plane 403a illustrated in FIG. 4A, an image of the subject 401 to be formed by the optical lens 402 is shown as a circle of confusion 405 on the imaging sensor plane 403b. Here, if the circle of confusion 405 is smaller than a permissible circle of confusion of the imaging sensor, the circle of confusion 405 can be considered to be substantially equivalent to a "point" provided where the circle of confusion 405 is in focus, and thus an image substantially equivalent to the in-focus image is acquired. On the other hand, if the circle of confusion 405 is larger than the permissible circle of confusion, a blurry image is acquired on the imaging sensor plane 403b.

Figure 4C:
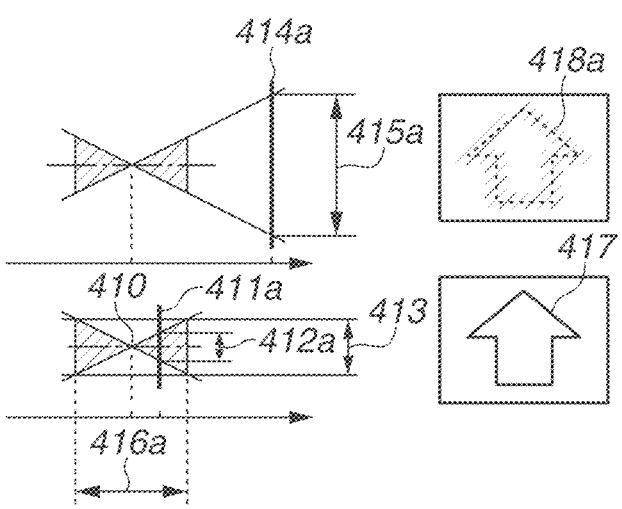

FIG. 4C is a diagram illustrating the above-described state, as seen from the side. Here, in FIG. 4C, if an image of the subject is formed at a focal point 410, and an imaging sensor plane is present at a position of a plane 411a, a circle-of-confusion diameter 412a is acquired. At that time, the circle-of-confusion diameter 412a is smaller than a permissible circle-of-confusion diameter 413 of the imaging sensor. Thus, an image 417 to be recorded using the imaging sensor is an in-focus image having no blur. On the other hand, if the imaging sensor plane is present at a position of a plane 414a, a circle-of-confusion diameter 415a is larger than the permissible circle-of-con fusion diameter 413. Therefore, an image 418a on the imaging sensor plane 414a is a blurry image. In FIG. 3C, an area indicated by oblique lines represents an area in which the circle-of-confusion diameter 412a is smaller than the permissible circle-of-confusion diameter 413, and such an area has a focal depth 416a. The focal depth 416a is converted corresponding to the subject side to acquire a depth of field.

Figure 4D:
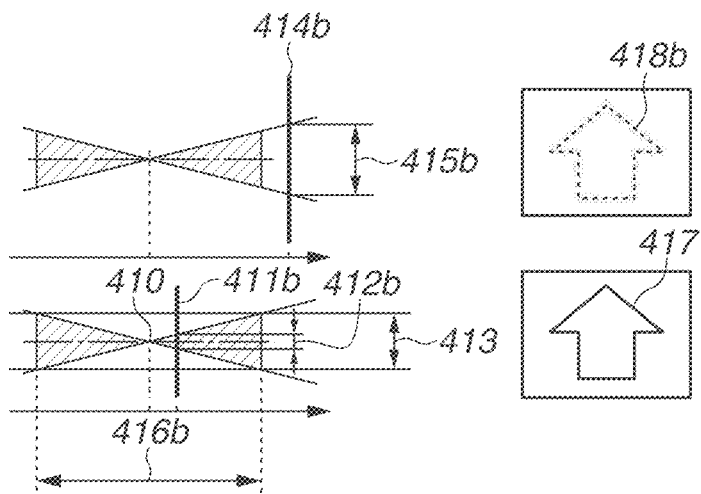

FIG. 4D illustrates a state in which an aperture is smaller than the state illustrated in FIG. 4C. In the state in which the diaphragm is smaller, the circle-of-confusion diameters 412a and 415a illustrated in FIG. 4C respectively change to be a circle-of-confusion diameter 412b with respect to a plane 411b and a circle-of-confusion diameter 415b with respect to a plane 414b. At that time, the circle-of-confusion diameter 415b illustrated in FIG. 4D is smaller than the circle-of-confusion diameter 415a illustrated in FIG. 4C. Thus, an image 418b to be acquired at that time has a blurring amount that is smaller than that of the image 418a. In addition, a focal depth 416b is greater than the focal depth 416a.

Figure 5:
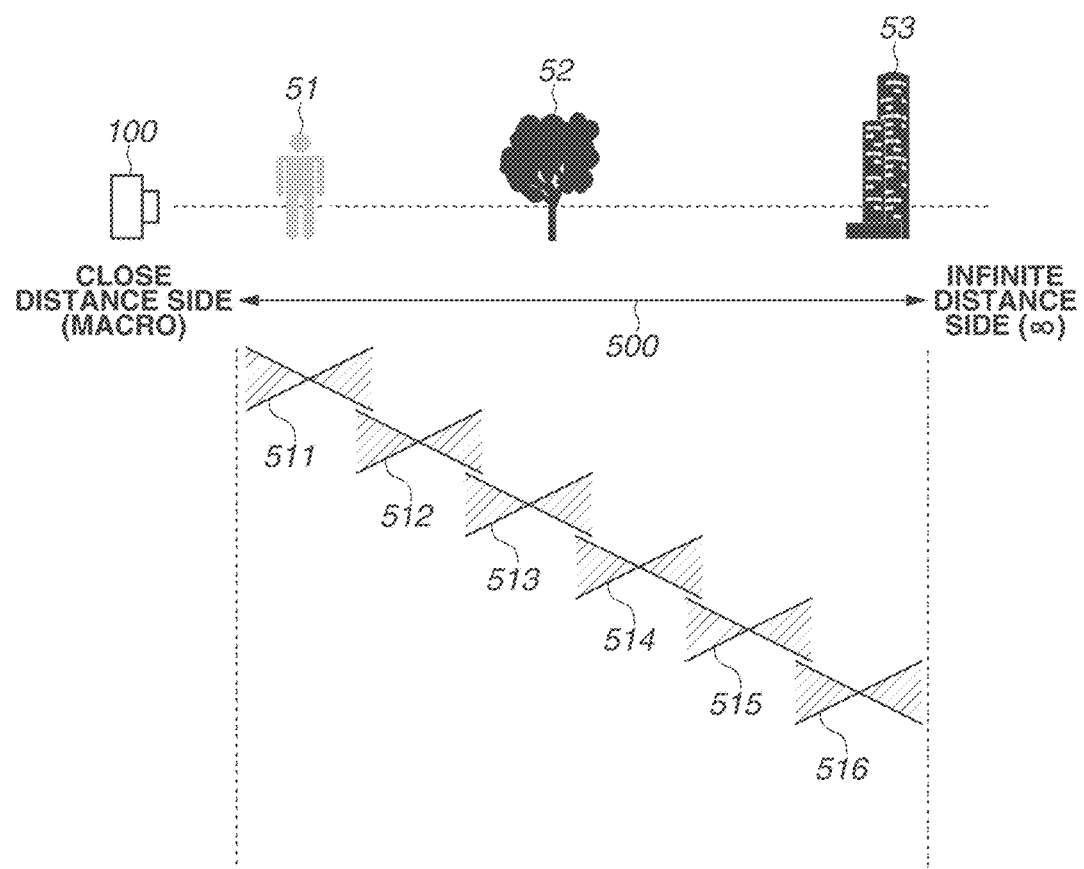
FIG. 5 is a diagram illustrating focus stacking image capturing according to the present exemplary embodiment.

FIG. 5 is a diagram illustrating focus stacking image capturing according to the present exemplary embodiment. In this case, assuming that subjects 51, 52, and 53 serve as subjects to be focused, these subjects are located at different focal planes. The subjects 51, 52, and 53 are present at different distances (subject distances) t from each other. The subjects 51, 52, and 53 are positioned in this order from a side close to the digital camera 100 (direction from a short distance side toward a long distance side). In single image capturing, not all of the subjects 51, 52, and 53 can be provided within a depth of field due to structure of the optical system 103 of the digital camera 100. Further, a depth of field for each image may be reduced to acquire higher perceived resolution. In such a case, a focal range 500 (bracket range) for focus bracket image capturing needs to be covered with a plurality of depths of focus to acquire a depth combined image that is in focus with respect to all of the plurality of subjects 51, 52, and 53. Each of focal depths 511 through 516 indicates a focal depth for each image capturing, and are arranged so as to cover the focal range 500. As a result, image capturing is performed (6 times) at focus positions that provide the focal depths 511 through 516, so that the subjects 51, 52, and 53 within the focal range 500 are in focus for any of the images. Further, areas within the depths of focus obtained by the image capturing are combined from the plurality of captured images. This enables in-focus images to be acquired across the focal range 500 (across the bracket).

However, even if image capturing is performed by the method illustrated in FIG. 5, part of a subject included in a combined image may be blurry depending on the subject. Accordingly, in the present exemplary embodiment, image capturing is performed by a method described below to improve the phenomenon in which part of a subject is blurry in a combined image.

Figure 6:
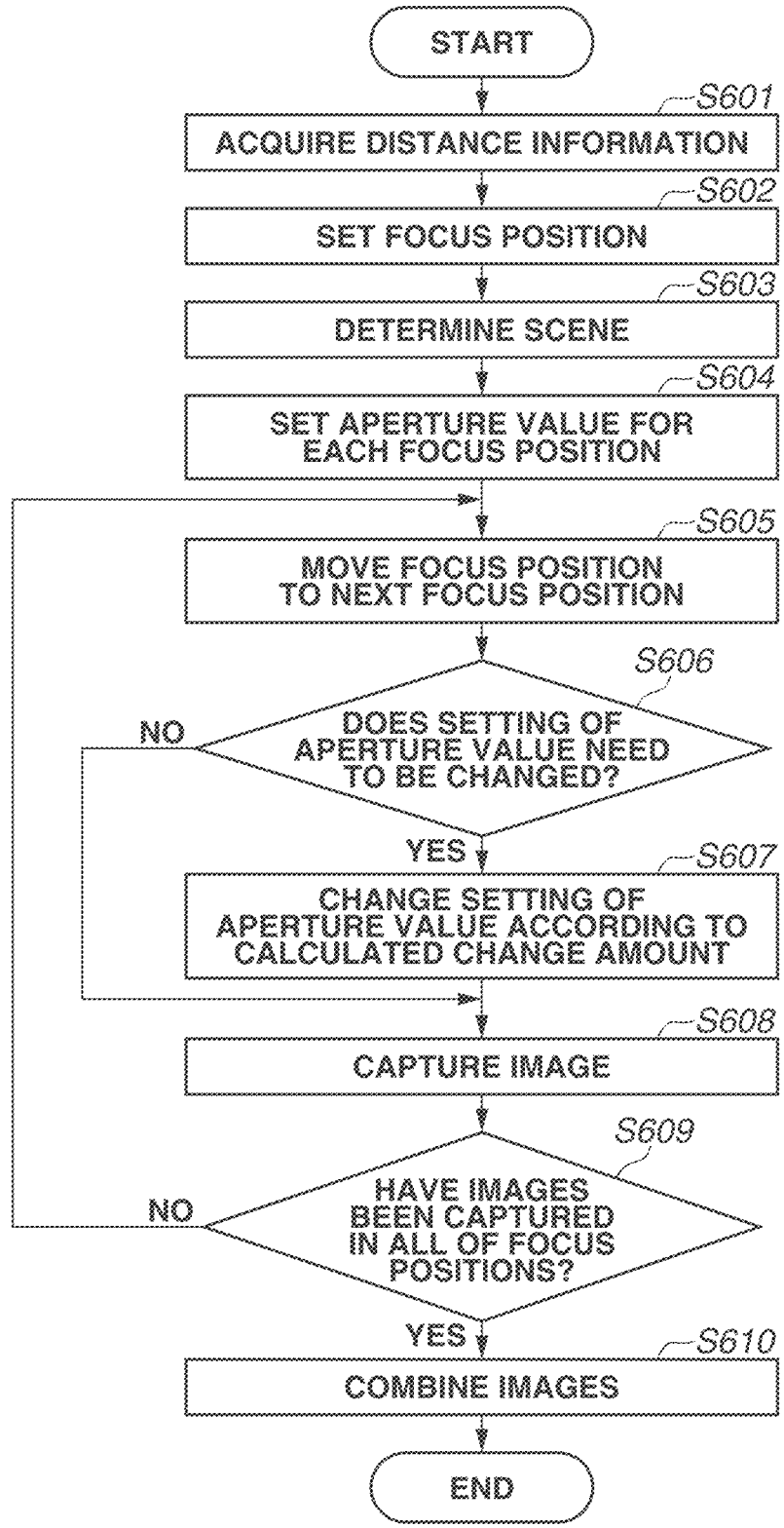
FIG. 6 is a flowchart illustrating focus stacking processing according to the present exemplary embodiment.

FIG. 6 is a flowchart illustrating focus stacking processing according to the present exemplary embodiment.

In step S601, the control circuit 101 calculates distance information from a pair of pupil-divided images formed on the image sensor 104, and temporarily stores the calculated distance information in the RAM 106.

In step S602, the control circuit 101 sets a focus position. For example, a user designates a focus position via a touch panel. The display 108 includes the touch panel. Subsequently, the control circuit 101 sets a plurality of focus positions at equal intervals in the front and rear of the focus position corresponding to the in-focus position. At the same time, the control circuit 101 determines an image capturing sequence of the set focus positions based on, for example, distance order.

In step S603, the control circuit 101 determines a scene based on distribution of the distance information acquired by the image sensor 104 in step S601. The scene determination will be described in detail below.

In step S604, the control circuit 101 sets the aperture value for each focus position based on the distance information acquired by the image sensor 104 in step S601 and the scene determined by the control circuit 101 in step S603. The aperture value setting will be described in detail below. If an aperture diameter of a diaphragm at each in-focus position is as large as possible (F-number is small) and a depth of field is shallow, perceived resolution of an image is enhanced. Thus, texture of a subject and expressive power with respect to a pattern are enhanced.

In step S605, if there is any focus position in which image capturing has not be performed out of the focus positions set in step S602, the control circuit 101 moves the focus position to any of such positions. Normally, focus positions are shifted in order from the close distance side or the infinite distance side.

In step S606, the control circuit 101 refers to the focus position calculated in step S604 to determine whether a setting of the aperture value needs to be changed at the current focus position with respect to the previous focus position. If the control circuit 101 determines that the setting of the aperture value needs to be changed (YES in step S606), the processing proceeds to step S607. In step S607, the control circuit 101 changes the setting of the aperture value according to the change amount calculated in step S604. Subsequently, in step S608, the control circuit 101 performs image capturing. If the control circuit 101 determines that the setting of the aperture value does not need to be changed (NO in step S606), the processing directly proceeds to step 3608 in which the image capturing is performed. In the image capturing, in order to cancels out fluctuations in exposure value caused by the change in the setting of the aperture value, a parameter such as International Standardization Organization (ISO) sensitivity and shutter speed, other than the aperture value setting is changed as necessary.

In step S609, the control circuit 101 determines whether image capturing has been performed at all of the focus positions. If the control circuit 101 determines that image capturing has been performed at all of the focus positions (YES in step S609), the processing proceeds to step S610 in which image combining is performed. If the control circuit 101 determines that there is any focus position in which image capturing has not been finished (NO in step S609), the processing returns to step S605.

In step S610, the image processing circuit 107 combines the plurality of images captured in step S608. An example of an image combining method is briefly described here. The image processing circuit 107 generates a combination map by using a contrast value acquired from each of the images. More specifically, in each target area or pixel, assuming that an image having the highest contrast value out of a plurality of images has a combination ratio of 100%, and the other images have a combination ratio of 0%. In a case where a combination ratio is changed from 0% to 100% (or from 100% to 0%) between adjacent pixels, an unnatural state in a combination border becomes noticeable. Accordingly, a low-pass filter having the predetermined number of pixels (number of taps) is applied to the combination map, thereby processing the combination map so that a combination ratio between the adjacent pixels does not change rapidly. Alternatively, a combination map may be generated based on a contrast value of each image in a target area or pixel so that a combination ratio is higher as a contrast value of an image becomes higher. The image processing circuit 107 multiplies a pixel value corresponding to each of the images by the combination ratio according to the combination map with respect to the images captured in step S608, and obtains a sum. The image processing circuit 107 performs such processing on all of the pixels, thereby generating a combined image.

Next, the scene determination in step S603 and the aperture value setting in step S604 are described.

As for the focus stacking processing as described above, if an aperture diameter of the diaphragm is larger, an image having higher texture of a subject and greater expressive power with respect to a pattern can be acquired. In addition, if image capturing is performed by using the same aperture value setting at each focus position, it is convenient from a control standpoint. However, as described above, the image capturing by using the same aperture value setting at all the focus positions is not always appropriate for every scene. Therefore, in the present exemplary embodiment, an operation for changing an aperture value setting at one of focus positions is performed according to a scene determination result. In the present exemplary embodiment, a scene condition for which the aperture value setting needs to be changed is stored beforehand in the ROM 105.

When focus stacking is performed, the control circuit 101 compares a scene pattern stored beforehand with the acquired distance information of the subject based on the distance information determined from the pair of pupil-divided images acquired by the image sensor 101 in step S601, and determines the scene. Hereinafter, determination of a focus position in which a setting of the aperture value is to be changed and the setting of the aperture value at such a focus position are described using an example of a scene to be stored beforehand.

Figure 7A:
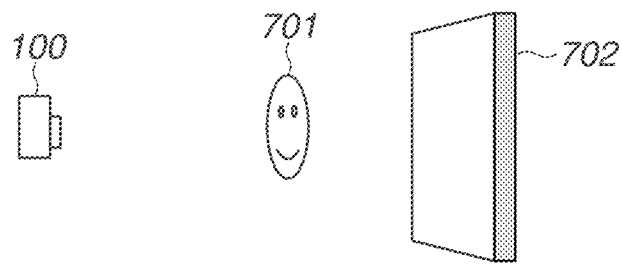
FIGS. 7A to 7E are diagrams illustrating an issue that occurs in focus stacking.
Figure 7B:
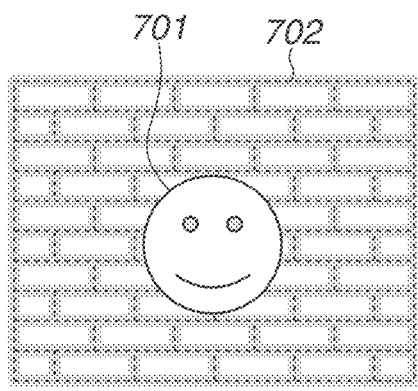
Figure 7C:
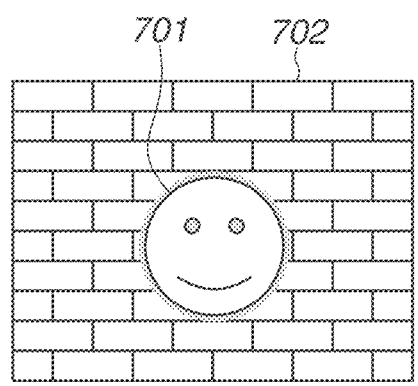
Figure 7D:
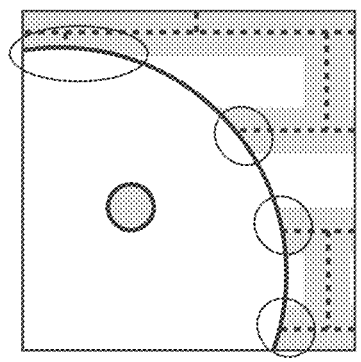
Figure 7E:
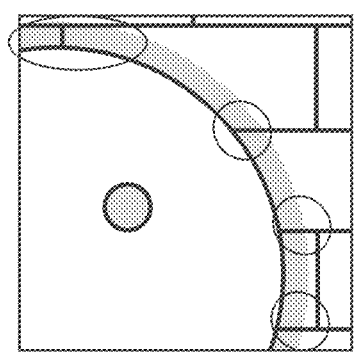

FIGS. 7A to 7E are diagrams illustrating an issue that occurs at the time of focus stacking. FIG. 7A is a diagram illustrating a positional relationship) of the digital camera 100, a subject 701, and a subject 702. FIG. 7B is a diagram illustrating an image captured in a state in which the front subject 701 is in focus, and FIG. 7C is a diagram illustrating an image captured in a state in which the rear subject 702 is in focus. FIG. 7D is an enlarged view illustrating a portion of the diagram illustrated in FIG. 7B. FIG. 7E is an enlarged view illustrating a portion of the diagram illustrated in FIG. 7C. Each of an area indicated by a circle in FIG. 7D and an area indicated by a circle in FIG. 7E corresponds to the same area of the subject.

For generating a combined image including both of the subject 701 and the subject 702 in focus, combining processing needs to be performed using the image with the subject 701 in focus illustrated in FIG. 7B and the image with the subject 702 in focus illustrated in FIG. 7C.

At that time, if the subject 701 and the subject 702 are spaced apart, a blur of the subject 702 is large in the image with the subject 701 in focus, whereas a blur of the subject 701 is large in the image with the subject 702 in focus. Since a contour of a subject becomes not only wider but also thinner as a blur of the subject becomes larger, a subject behind thereof is seen as if it were transmitted through. As illustrated in FIG. 7D, if the rear subject 702 is blurry, the front subject 701 is not affected. However, as illustrated in FIG. 7E, if the front subject 701 is blurry, the rear subject 702 is transmitted through the wide contour of the front subject 701.

Accordingly, the area indicated by the circle in FIG. 7D includes the rear subject 702, which is blurry, whereas the area indicated by the circle in FIG. 7E includes the front subject 701, which is blurry. In this case, the area indicated by the circle includes the blurry subject even if either the image illustrated in FIG. 7B or the image illustrated in FIG. 7C is prioritized and combined.

A method for setting the diaphragm to prevent, correct, and/or minimize blurriness in the combined image is described with reference to FIGS. 8A to 8C and 9A to 9C.

FIGS. 8A, 8B, and 8C are diagrams illustrating a setting value of an aperture according to a position of a subject. In FIG. 8A, a horizontal axis indicates distance from the digital camera 100, whereas a vertical axis indicates resolution of an image. Further, in FIG. 8A, there are focus positions P11 to P21, and a waveform indicates resolution of an image according to a subject distance if the image is captured at each focus position. The nearest portion of a subject 801 as seen from the digital camera 100 corresponds to the focus position P11, whereas the farthest portion of the subject 801 corresponds to the focus position P17. The nearest portion of a subject 802 corresponds to the focus positron P21.

The images captured at the respective focus positions P11 through P17 and P21 need to be used to generate a combined image in which all of the subjects 801 and 802 should be in focus.

FIG. 8B is a diagram illustrating the subjects 801 and 802 as seen from a direction of arrow Z illustrated in FIG. 8A. In a case where focus stacking is performed, an image captured at the focus position P11 is used for a middle portion of the subject 801 illustrated in FIG. 8B, and an image captured at the focus position P17 is used for an outer edge portion of the subject 801. For the portion between the middle portion and the outer edge portion of the subject 801, images captured at the focus positions P12 to P16 are used in order from the center outward. Therefore, as for the subject 801, the images captured at focus positions close to each other in adjacent areas are used for the focus stacking. Thus, the blur described in FIG. 7D does not occur. However, positions of the subjects 801 and 802 are sufficiently apart from each other relative to a depth of field set at the focus position P21. In such a case, in an image captured at the focus position P21, an outer edge portion of the subject 801 is blurry, and one portion of the subject 802 is seen to be transmitted through the blurry outer edge portion of the subject 801, as the case of FIG. 7E.

Accordingly, in step S603 of FIG. 6, if the control circuit 101 determines that the subjects 801 and 802 are focus position P17 based on distance information distribution, the processing proceeds to step S604 in which the control circuit 101 changes a setting of the diaphragm at the focus position P21. Here, distance in format ion distribution shows a distribution of distance of objects captured in one frame. More specifically, an aperture diameter of the diaphragm at the focus position P21 is set to be smaller than those at the other focus positions, and a depth of field is increased as compared to the depth of field used at the other focus positions. The effect of different depth of fields was described above with reference to FIGS. 4C and 4D. Although setting the depth of filed to be deeper may slightly decrease resolution of the subject 802 in the image captured at the focus position P21, a blur of the outer edge portion of the subject 801 can be reduced. Accordingly, if the image captured at the focus position P21 is used at a border portion between the subjects 801 and 802 at the time of focus stacking, generation of a blur around the subject 801 can be reduced. In this case, a focus position does need to be changed.

FIG. 8C is a diagram illustrating a state in which a distance between the subjects 801 and 802 is shorter than that in FIG. 8A. In FIG. 8C, the subject 802 in an image captured at a focus position P27 is not largely blurry, and an outer edge portion of the subject 801 in an image captured at a focus position P28 is not largely blurry. Thus, even if a plurality of subjects is present at different distances, an aperture diameter of the diaphragm at a specific focus position does not need to be decreased as long as images captured at focus positions close to each other in adjacent areas are used in focus stacking. For instance, a threshold of distance of focus positions of captured images can be used to determine whether to decrease the specific focus position.

FIGS. 9A, 9B, and 9C are other diagrams illustrating an aperture setting value according to a position of a subject.

FIG. 9A illustrates a state in which one subject including a front portion 901 and a rear portion 902 is arranged. Each of FIGS. 9B and 9C is a diagram illustrating the subject including the front portion 901 and the rear portion 902 as seen from a direction z illustrated in FIG. 9A. In a case where focus stacking is performed, images captured at respective focus positions P31 to P36 illustrated in FIG. 9A are used for the front portion 901, and an image captured at a focus position P37 illustrated in FIG. 9A is used for the rear portion 902.

As illustrated in FIG. 9B, an outer edge portion 901b on the farthest side of the front portion 901 has an outer diameter that is slightly larger than that of an crater edge portion 901a on the nearest side of the front portion 901. Therefore, as illustrated in FIG. 9C, in an image captured at the focus position P37 in which the rear portion 902 is in focus, a blur of the outer edge portion 901a on the near side of the front portion 901 may be extended outside the outer edge portion 901b on the farther side of the front portion 901.

In a case where focus stacking is performed using these images, an image having no blur can be acquired for the front portion 901 by using the images captured at respective in-focus positions P31 to P36. However, the use of the image captured at the focus position P37 for the rear portion 902 may cause a blurry image of the outer edge portion 901 to be included in an area at a position outside the outer edge portion 901b on the rear side of the front portion 901.

Accordingly, even in a case where images captured at focus positions close to each other in adjacent regions are used in focus stacking, if there is a subject area with a focus position that is farther than a predetermined distance within a predetermined range on an image, a depth of field at a father focus position is set to be larger. However, in FIG. 9C, a decrease in the aperture diameter of the diaphragm only at the focus position P37 causes the following issue. Images are captured while focus positions are gradually changed, and then such images are combined. However, only an image captured at a specific focus position has a resolution lower than an image captured at another focus position. This causes a difference in perceived resolution to be noticeable if the images are combined.

In such a case, as illustrated in FIG. 9A, control is performed so that the aperture diameter of the diaphragm becomes gradually smaller as the focus position becomes closer to a rear side. This not only reduces inclusion of a blurry area in a combined image, but also enables a difference in perceived resolution between combined image areas to be less noticeable.

As described above, in the present exemplary embodiment, in a case where there is a subject area with an in-focus position that is farther than a predetermined distance within a predetermined range on an image, an aperture diameter of the diaphragm at a farther focus position is set to be smaller than aperture diameters of the diaphragm at other focus positions.

The predetermined distance with respect to such a focus position can be a fixed value that is set in such a manner that a blur is prevented even if an aperture diameter of the diaphragm is any size. Alternatively, the predetermined distance with respect to such a focus position can be a value that is set based on a depth of field of an aperture diameter of the diaphragm in another focus position.

Further, the predetermined range on the image can be a predetermined fixed value, or can be set according to an aperture diameter of the diaphragm at another focus position. In this case, an extent of blur with respect to a subject distance may be measured beforehand for each aperture diameter of the diaphragm and resultant information may be stored in a memory.

The determination of whether the subject area is positioned in the predetermined range on the image is not necessarily required. The determination of whether a focus position is present in a subject area farther from the predetermined distance may only be made. In such a case, an aperture diameter of the diaphragm in one of the focus positions may be changed.

Figure 10:
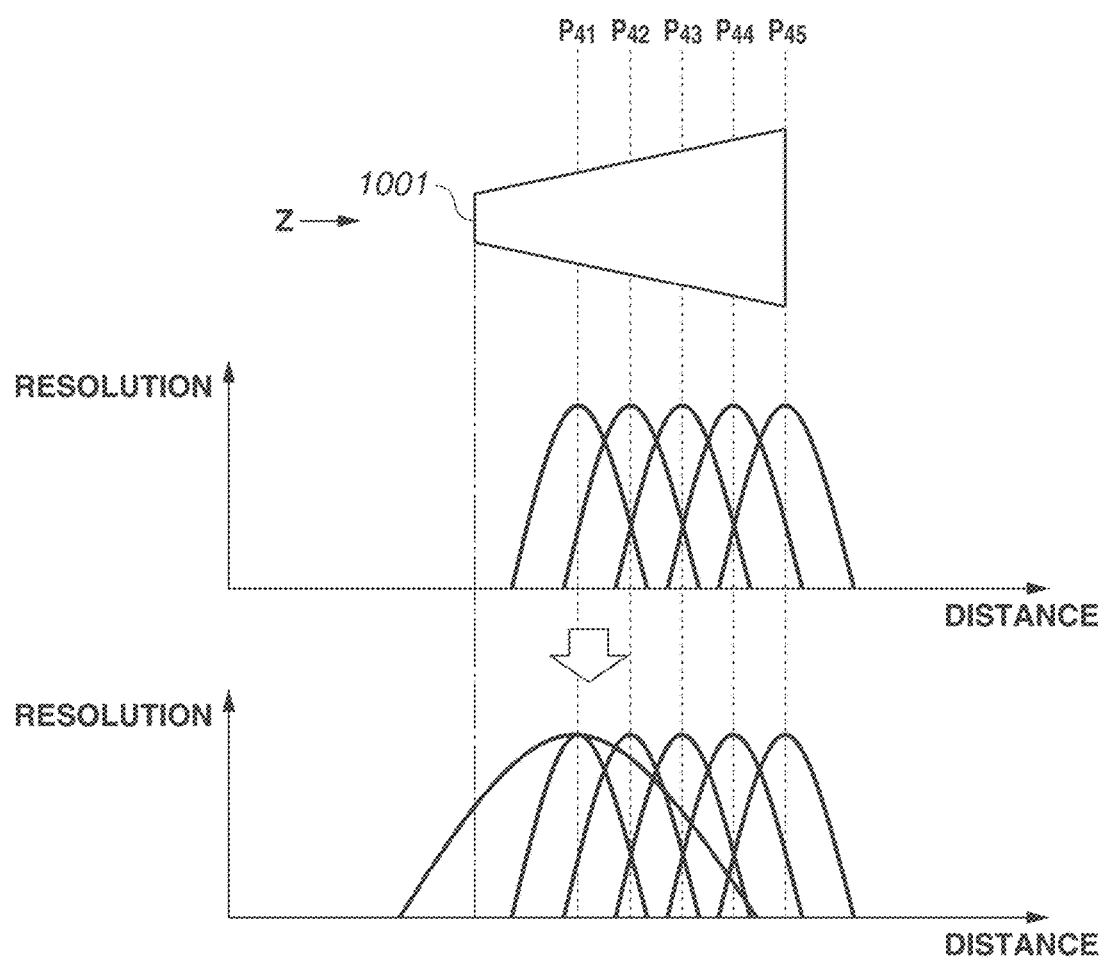
FIG. 10 is another diagram illustrating a setting value of the aperture according to a position of a subject in the present exemplary embodiment.

FIG. 10 is another diagram illustrating a setting value of the aperture according to a position of a subject. In FIG. 10, a horizontal axis indicates distance from the digital camera 100, whereas a vertical axis indicates resolution of an image.

In FIG. 10, a focus position P41 represents a close distance end focus position that is settable by the digital camera 100. In the close distance end focus position, an image satisfying a predetermined resolution cannot be captured with respect to an end portion on a front side of a subject 1001 if an aperture diameter is similar to an aperture diameter of the diaphragm set for another focus position.

In step S603 in FIG. 6, if the control circuit 101 determines that the above state is present, then in step S604, the control circuit 101 sets an aperture diameter that is decreased, so that a depth of field is increased with respect to the close distance end focus position P41 in addition to an aperture diameter similar to that for another focus position. In other words, at the focus position P41, image capturing is performed two times by using two aperture value settings having different depths of field.

At the focus position P41, an aperture diameter of the diaphragm is further decreased and a depth of field is increased to capture an image. This enables an image in focus with respect to an end portion on the front side of a subject 1001 to be captured. However, this alone can cause a decrease in perceived resolution of the image acquired at the focus position P41. Thus, at the focus position P41, an image is captured again by using an aperture value setting similar to that for another focus position, and the images are mixed according to a focus state to prevent a decrease in perceived resolution of the image with a combined depth.

As described above, according to the present exemplary embodiment, an image pickup apparatus, based on subject distance distribution, can appropriately set an aperture diameter of the diaphragm at each of focus positions in a case where images to be used for focus stacking are captured.

Other Exemplary Embodiments

A digital camera for personal use is described as the forgoing exemplary embodiment. However, the present exemplary embodiment can be applied to a portable device and a smart phone or a network camera connected to a server as long as a camera function that can change a focus position and an aperture value setting is provided.

Moreover, a program for performing one or more functions of the above-described exemplary embodiment(s) may be supplied to a system or apparatus via a network or a recording medium. In such a case, one or more processors in a computer in the system or the apparatus can read and execute the program to realize the above-described exemplary embodiment(s). Moreover, the above-described exemplary embodiment (s) can be realized by a circuit (e.g., an application specific integrated circuit (ASIC)) that can perform one or more functions of the above-described exemplary embodiment(s).

Other Embodiments

Embodiment(s) of the present invention can also be realized by a computer of a system or apparatus that reads out and executes computer executable instructions (e.g., one or more programs) recorded on a storage medium (which may also be referred to more fully as a non-transitory computer-readable storage medium) to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment (s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims foreign priority benefit of Japanese Patent Application No. 2017-031502, filed Feb. 22, 2017, which is hereby incorporated by reference herein in its entirety.

What is claimed is:

1. An image pickup apparatus comprising:
an image sensor configured to capture a plurality of images at different focus positions of an optical system; and
a control circuit configured to control a depth of field of the optical system when the image sensor captures an image,
wherein, if the control circuit determines that a plurality of subject areas satisfies a predetermined condition based on a distance for each subject area, the control circuit increases a depth of field of the optical system in a case where the image sensor captures one of the plurality of images, in comparison with a case where the plurality of subject areas does not satisfy the predetermined condition, and
wherein the predetermined condition includes a difference in distance of any two of the plurality of subject areas in optical axis direction being greater than the predetermined distance.

2. The image pickup apparatus according to claim 1, wherein the predetermined condition further includes presence of the plurality of subject areas with the difference in distance greater than the predetermined distance within a predetermined range on an image.

3. The image pickup apparatus according to claim 1, wherein, if the plurality of subject areas satisfies the predetermined condition, the control circuit increases a depth of field of the optical system in a case where an image at an focus position with respect to a farther subject out of the plurality of subjects is captured, in comparison with a case where the plurality of subject areas does not satisfy the predetermined condition.

4. The image pickup apparatus according to claim 3, wherein, if the plurality of subject areas satisfies the predetermined condition, the control circuit increases a depth of field of the optical system such that resolution of a closer subject area out of the plurality of subject areas is higher in a case where an image in an focus position with respect to a farther subject area out of the plurality of subject areas is captured.

5. The image pickup apparatus according to claim 1, wherein the control circuit gradually increases a depth of field of the optical system in a case where one of the plurality of images is captured.

6. The image pickup apparatus according to claim 1, wherein the control circuit does not change a focus position in a case where the plurality of images is captured, regardless of whether the plurality of subject areas satisfies the predetermined condition.

7. The image pickup apparatus according to claim 1, wherein the different focus positions include focus positions arranged at equal intervals.

8. The image pickup apparatus according to claim 1, wherein the control circuit controls a depth of field of the optical system by controlling a diaphragm of the optical system.

9. The image pickup apparatus according to claim 1, wherein the control circuit determines a distance of the subject area based on a pair of pupil-divided images.

10. The image pickup apparatus according to claim 9, wherein the image sensor has a structure where a plurality of photoelectric conversion units exist corresponding to one micro lens, and outputs the pupil-divided images.

11. The image pickup apparatus according to claim 1, wherein the control circuit performs combination processing by using the plurality of images captured by the image sensor.

12. An image pickup apparatus comprising:
an image sensor configured to capture a plurality of images at different focus positions of an optical system; and
a control circuit configured to control a depth of field of the optical system when the image sensor captures an image,
wherein, if a subject area is positioned on a close distance side than a predetermined distance, the control circuit causes the image sensor to capture a plurality of images by using a plurality of depths of field at a focus position on the close distance side, and
wherein the control circuit causes any of the depths of field in when the images are captured by the image sensor at the focus position on the close distance side to be larger than a depth of field when another image is captured.

13. The image pickup apparatus according to claim 12, wherein the predetermined distance is a distance with which predetermined resolution cannot be obtained by using a depth of field that is same as the depth of field of the optical system set at another focus position when the image sensor captures an image at the focus position on the close distance side.

14. A control method for an image pickup apparatus comprising:
capturing a plurality of images having different focus positions; and
controlling a depth of field when an image is captured,
wherein, in a case where it is determined that a plurality of subject areas satisfies a predetermined condition based on a distance for each subject area, a depth of field when one of the plurality of images is captured is increased compared with a case where it is determined that the plurality of subject areas does not satisfy the predetermined condition, and
wherein the predetermined condition includes a difference in distance of any two of the plurality of subject areas in optical axis direction being greater than a predetermine distance.

15. A control method for an image pickup apparatus, comprising:
capturing a plurality of images having different focus positions; and
controlling a depth of field when the an image is captured,
wherein, if a subject area is positioned on a close distance side relative to a predetermined distance, a plurality of images is captured by using a plurality of depths of field at a focus position on the close distance side, and
wherein any of the depths of field when the images are captured at the focus position on the close distance side controlled to be larger than a depth of field when another image is captured.

16. A non-transitory computer readable storage medium storing a control method for an image pickup apparatus, the method comprising:
capturing a plurality of images having different focus positions of an optical system; and
controlling a depth of field of the optical system while capturing the image,
wherein, if a plurality of subject areas satisfies a predetermined condition based on a distance for each subject area, increasing a depth of field of the optical system in a case where one of the plurality of images is captured, in comparison with a case where the plurality of subject areas does not satisfy the predetermined condition, and
wherein the predetermined condition includes a difference in distance of any two of the plurality of subject areas in an optical axis direction being greater than the predetermined distance.

* * * * *